Jan. 19, 1965   J. M. STIPCEVICH   3,165,832
PAINT REMOVER SET

Filed May 1, 1963   3 Sheets-Sheet 1

INVENTOR.
JOHN M. STIPCEVICH
BY
ATTORNEY

INVENTOR.
JOHN M. STIPCEVICH
BY
ATTORNEY

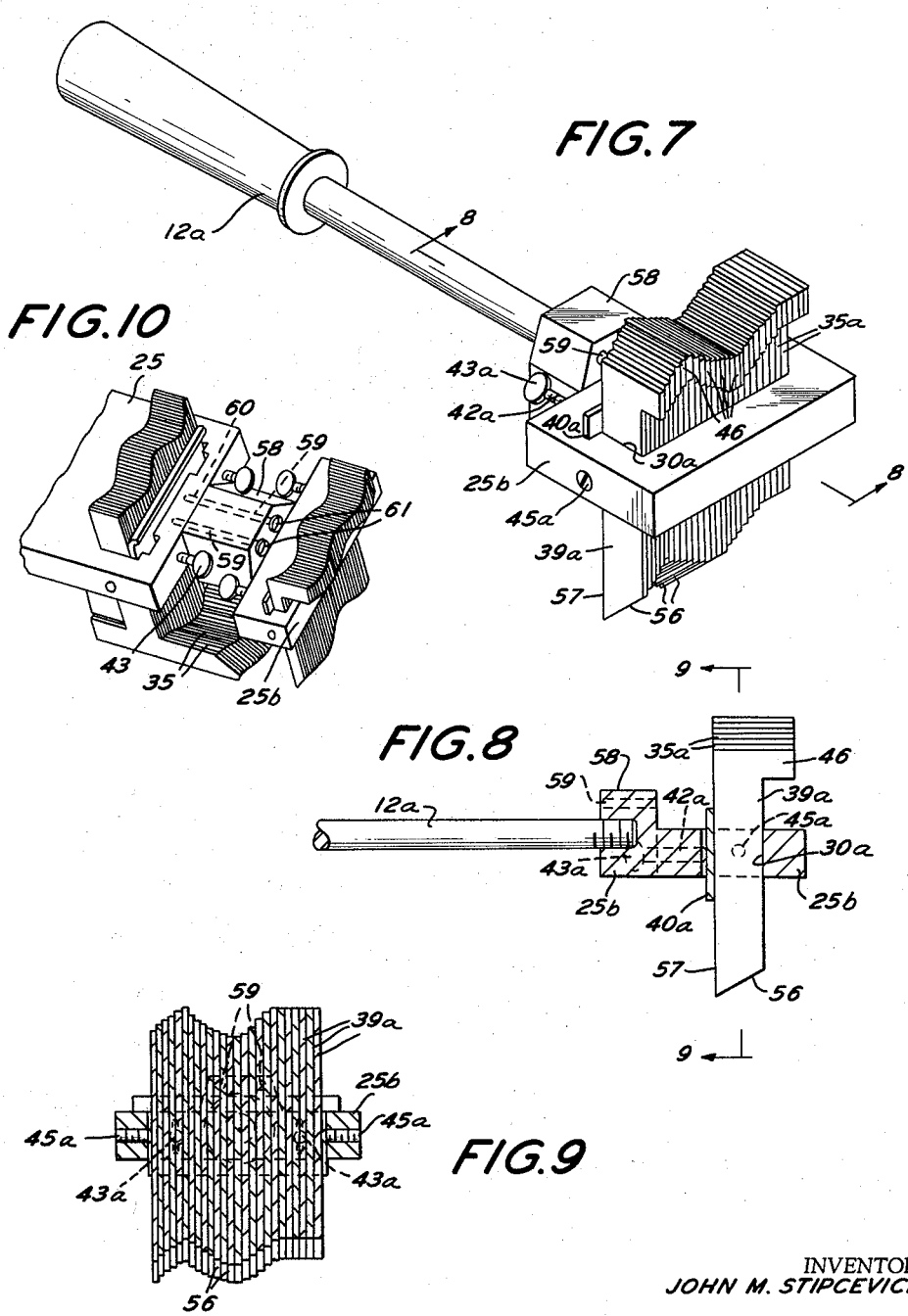

3,165,832
PAINT REMOVER SET
John M. Stipcevich, Westmont, N.J.
(114 Hampton Road, Collingswood, N.J.)
Filed May 1, 1963, Ser. No. 277,300
1 Claim. (Cl. 30—140)

This invention relates to a paint remover set and more particularly to such a set for removing paint varnish and the like from nonplanar surfaces.

In the refinishing of doors, windows and paneled partitions, the removal of the finish with the methods and apparatus now available is laborious and time consuming. Because of the excessive labor involved in removing the old finish, particularly from wood partitions, it is less expensive to use new panels than to refinish them.

It has heretofore been proposed to soften the old finish to be removed by the use of strong solvents, volatile and inflammable liquids or by a flame but such operations are extremely hazardous. The presently available electrically heated paint softeners, although not considered hazardous, are useful only on flat surfaces and are ineffective on the curved or stepped surfaces of molding trim.

It is the principal object of the present invention to provide paint removing apparatus which is particularly suited for removal of old finishes of paint, varnish or the like, from intricately curved or shaped moldings.

It is a further object of the present invention to provide a paint remover set having a plurality of components one of which is particularly suited to the softening by heat of the finish to be removed and the other of which is particularly suited to the removal of the softened finish.

It is a further object of the present invention to provide a paint remover set having a plurality of components one of which preferably conditions the finish for removal and the other of which is adapted for removal, by scraping, of the softened finish, both components having adjustable contour elements clamped to conform to the surface to be cleaned.

It is a further object of the present invention to provide a paint remover set in which a heating device is employed, with adjustable contact or contour conforming elements, and provisions for effective heat transfer thereto free from likelihood of injury to the user.

It is a further object of the present invention to provide a paint remover set having a heating device with adjustable contact or contour conforming elements, the elements being adjustably secured and readily movable to and securable in the desired contoured position for use.

It is a further object of the present invention to provide in a paint remover set, a heating device having a group of contact or contour elements heated thereby which group can be adjusted to transverse or parallel positions with respect to the handle to give a wide range of usefulness.

It is a further object of the present invention to provide, in a paint remover set, of a simple but effective scraper which has contact or contour elements for quick adjustment to the desired shape.

It is a further object of the invention to provide improved methods for the removal of old finishes, such as paint and varnish, from intricately curved or shaped extended surfaces.

Other objects and advantageous features of the invention will be apparent from the description and claim.

The nature and characteristic features of the invention will be more readily understood from the following description taken in connection with the accompanying drawings forming part thereof, in which:

FIG. 7 is a perspective view of a scraper in accordance with the invention forming part of the paint remover set;

FIG. 8 is a longitudinal sectional view taken approximately on the line 8—8 of FIG. 7;

FIG. 9 is a transverse sectional view taken approximately on the line 9—9 of FIG. 8; and FIG. 10 is a fragmentary perspective view showing the heater and scraper attached in tandem for simultaneous use.

Figure 1:
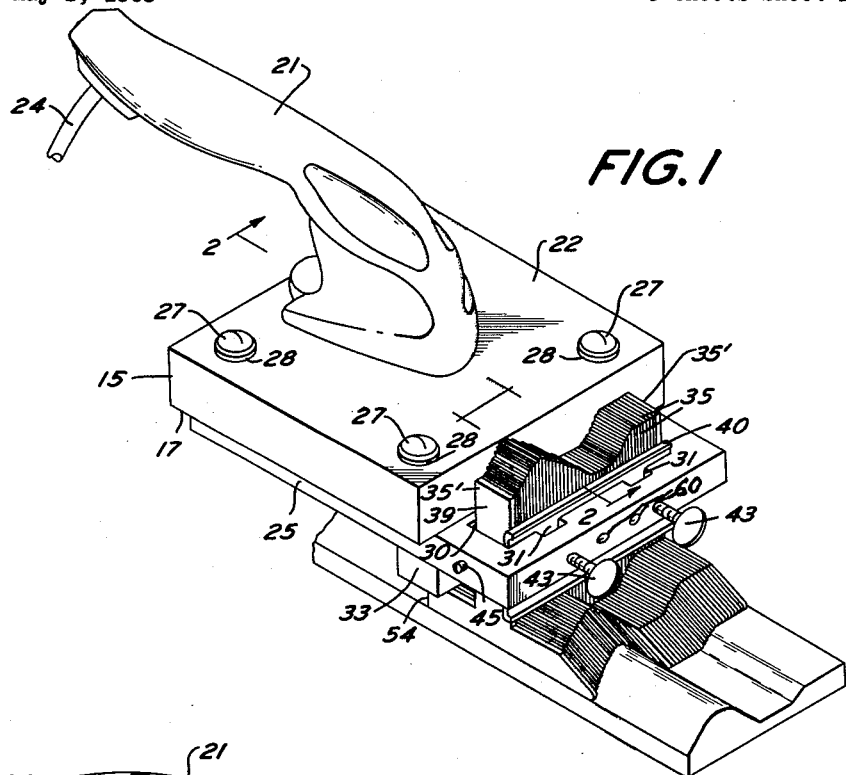
FIGURE 1 is a view in perspective of a heating device in accordance with the invention forming part of a paint remover set.
Figure 2:
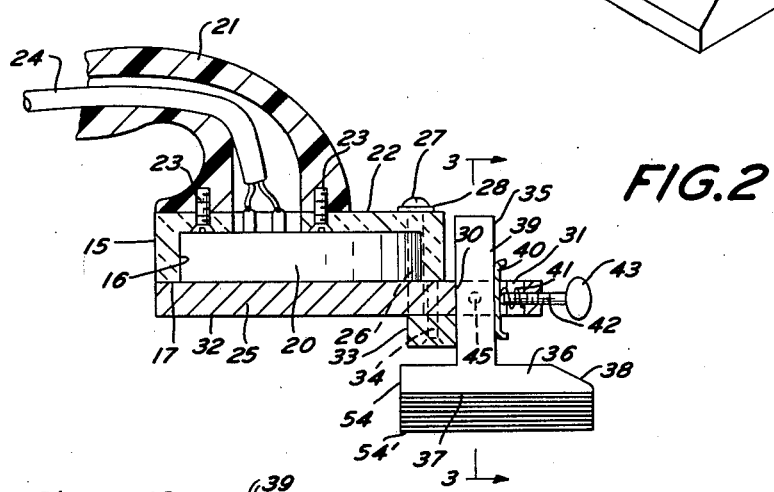
FIG. 2 is a longitudinal sectional view taken approximately on the line 2—2 of FIG. 1.
Figure 3:
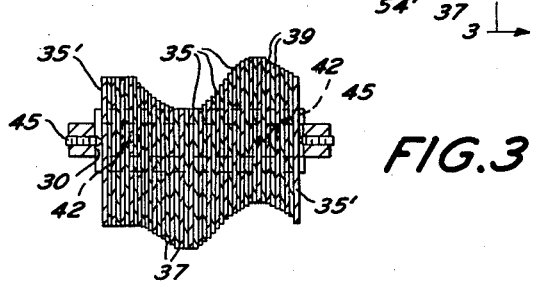
FIG. 3 is a transverse sectional view taken approximately on the line 3—3 of FIG. 2.
Figure 4:
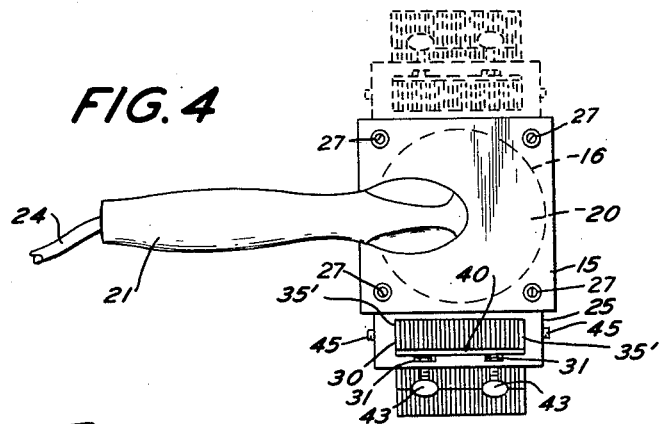
FIG. 4 is a top plan view, on a smaller scale, of the heating device shown in FIG. 1 and showing alternative dispositions of the contour elements.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to FIGS. 1 to 4 of the drawings, in which the heating device is illustrated a mounting block 15 is provided, of any suitable thermal and electrical insulating material which is resistant to impact shock and free from any tendency to chip or shatter, and which can be readily formed, shaped and drilled. One particularly suitable material for this purpose is a board insulation of amosite asbestos fiber, diatomaceous silica and an inorganic binder which is resistant to molten metals up to approximately 1350° F., available from Johns-Manville under the trade name of "Marinite."

The mounting block 15 is preferably rectangular in plan and has an interior space or recess 16 extending upwardly from the bottom face 17 for the reception of a heating unit 20 of any desired type.

One suitable heating unit is of the immersion type of coiled nickel-chrome resistor wire in spaced relation embedded in compacted refractory material which both insulates the wire and transfers heat rapidly to the enclosing ring shaped metallic sheath.

The mounting block 15 has a handle 21 secured thereto in any desired manner to the upper face 22 thereof, such as by screws 23.

Electrical energy is supplied to the heating unit 20 by a multiple conductor cable 24 which preferably extends through the interior of the handle 21 to a source (not shown) of electric energy.

The bottom face 17 of the mounting block 15 is covered by a metallic heat transfer plate 25 which is secured in position by screws 26 threaded thereinto. The heads 27 of the screws 26 preferably engage washers 28 which bear on the top face 22 of the mounting block 15. The symmetrical arrangement of the screws 26 and the plate 25 permit the disposition of the plate 25 in any selected position, i.e. forwardly as in FIGS. 1 and 2 or on either side, as in FIG. 4.

The heat transfer plate 25 has a transverse slot 30 therein with spaced recesses 31 extending forwardly therefrom. Transversely disposed on the bottom face 32 of the plate 25, and with its forwardmost surface aligned with the rear face of the slot 30 a supplemental heat transfer bar 33 can be provided, removably held in position on the plate 25 by screws 34 extending into threaded engagement in the plate 25.

A plurality of inverted T-shaped contact or contour conforming elements 35 are provided each of which has a foot portion 36 of substantial length with a bottom edge 37 and an inclined front edge 38. The foot portion 36 has a mounting shank 39 integral therewith and perpendicularly disposed with respect thereto.

The contact or contour conforming elements 35 are preferably formed as stampings from good thermally conductive sheet material, such as aluminum or copper, aluminum being preferred because it is lighter in weight. The endmost elements 35' can be of heavier material for added strength. The elements 35 and 35' are carried in the slot 30 and in order to retain the elements 35 and 35' with their shanks 39 in the slot 30 for adjustment a transversely extending C-shaped pressure plate 40 is provided, urged to holding engagement with the shanks 39 by compression springs 41 in the recesses 31 and mounted on threaded portions 42 of thumb screws 43.

Set screws 45 carried by the plate 25 and in intersecting relation to the ends of the slot 30 and engageable with elements 35' provide for further tightening of the contact or contour conforming elements 35 to retain the same in adjusted laminar array positions.

The front end of the plate 25 is preferably provided with threaded openings 60 for use in tandem mounting.

Figure 5:
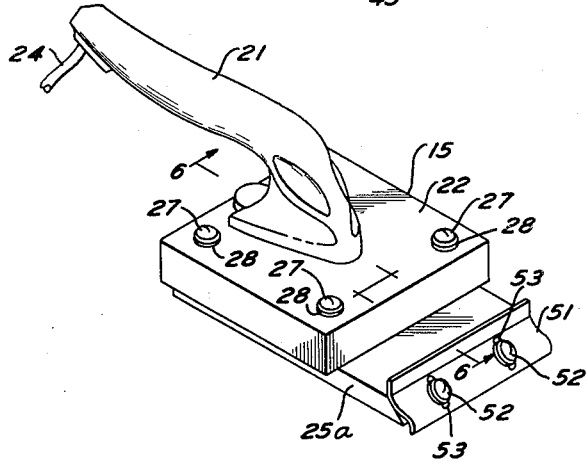
FIG. 5 is a perspective view of the heating device employed in FIG. 1 with a different element carried thereby for combined heating and scraping.
Figure 6:
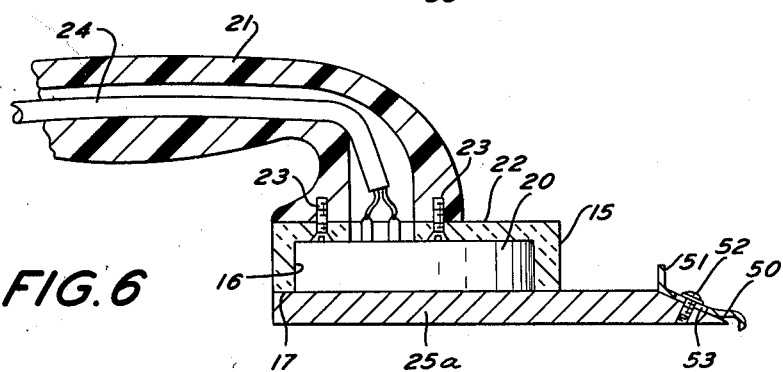
FIG. 6 is a longitudinal sectional view taken approximately on the line 6—6 of FIG. 5.

In FIGS. 5 and 6 a modified form of heat transfer plate 25a is shown for the attachment to the mounting block 15 by the screws 26 having heads 27 and washers 28, as before. The plate 25a has a front beveled edge 50 and a heated scraper blade 51 is adjustably positioned thereon by screws 52 which extend into the plate 25a through elongated slots 53. The scraper blade 51 is particularly useful on flat or convex surfaces and when mounted with the scraper blade 51 disposed forwardly is used preferably by pulling the device rearwardly, or toward the user, so that the scraper engages the paint or varnish which has been heated by the plate 25a. Should it be desired to scrape by pushing rather than pulling the block 15 can be reversely mounted on the plate 25a.

If the contact or contour elements 35 and 35' are made of hard or hardened material, such as steel, their rear edges 54 could be used for purposes of scraping as well as heating.

It is preferred, however, to use the device shown in FIGS. 1 to 4, inclusive, merely for heating the paint, varnish or other finish to be removed, and to utilize a separate scraper as shown in FIGS. 7, 8 and 9.

Referring now more particularly to FIGS. 7, 8 and 9, the scraper there shown includes a plate 25b having a transverse slot 30a therein.

A plurality of contact or contour conforming elements 35a are provided each of which has a mounting shank 39a. The shanks 39a, at their upper ends, have projections 46 which limit the downward movement of the elements 35a. Each of the elements 35a, at its lower end has a beveled portion 56 intersecting the rear face 57 which provides a point on the lower end of each element 35a to aid in scraping.

A pressure plate 40a is provided urged into holding engagement with the shanks 39a by the threaded portions 42a of thumb screws 43a.

Set screws 45a carried by the plate 25b and in intersecting relation to the slot 30a provided for tightening of the contour conforming elements 35a to retain the same in adjusted position.

A handle 12a detachably mounted as by threading the same into a shank 58 on plate 25b provides for manual manipulation of the plate 25b and the contour elements 35a carried thereby. The shank 58 also preferably is provided with drilled openings 59 for tandem mounting of the scraper. Screws 61 engaged in the openings 59 and 60, in aligned positions of these openings provide for the tandem mounting shown in FIG. 10.

The mode of operation will now be pointed out.

The heating device is prepared for use by backing off the set screws 45 and backing off the thumb screws 43. The mounting shanks 39 are engaged by the pressure plate 40, urged by the springs 41.

The bottom edge faces 37 of the foot portions 36 are pressed against the surface of the molding or other part to be cleaned. The contact or contour elements 35 and 35' are slidably moved, by this pressing action, so that the edge faces 37 take positions in conformity with the surface (see FIGS. 1 and 3). The elements 35 and 35' are then secured in their adjusted positions by tightening the thumb screws 43 and tightening the set screws 45.

The heating device upon energization of the heating unit 20 is then ready for use along the surface to heat the varnish, paint or other surface coating to facilitate the separation and removal of such surface coating. Heat from the heating unit 20 is transferred to the heat transfer plate and therefrom, and from the supplemental bar 33 if it is used, to the mounting shank portions 39 of the contour elements 35 and 35' and to and through the feet 36. The heating thus made available at the complemental contoured surface provided by the edges 37 is effective for softening and separating the surface coating on the molding or the like to aid in the removal of such surface coating.

While the heating device, is preferably used merely for heating, in the embodiment of FIGS. 1 to 4, inclusive, the rear edges 54' at their intersections with the bottom edges 37 provide scraping corners which may be utilized.

More rapid removal of the surface coating can be effected if as the same is heated or immediately after the same has been heated it is brushed with a wire brush to break up the coating and partially remove the same.

The scraper shown in FIGS. 7, 8 and 9 is preferably then employed for removal of the heated and disrupted coating.

In order to prepare the scraper for use the contour elements 35a, with the thumb screws 43a and set screws 45a retracted, are positioned with their lower margins at the intersection of the rear faces 57 and of the beveled portions 56 complemental to the surface to be scraped. The contour elements 35a are then secured in their adjusted positions for use by tightening the thumb screws 43a and the set screws 45a.

A very rapid cleaning action and removal of an old finish of paint, varnish or the like can be effected in many instances by holding the heating device in one hand and the scraper in the other and simultaneously moving both devices along and in engagement with the surface to be cleaned with short overlapping strokes of the devices.

As shown in FIG. 10, the scraper of FIGS. 7, 8 and 9 can be attached to the heating device of FIGS. 1 to 4 by the screws 61, after the handle 12a has been removed. The tandem unit of FIG. 10 may easily be used with one hand and is preferably pulled toward the user. If it is desired to remove the old finish by pushing in place of pulling the mounting block 22 and handle 21 can be reversed with respect to the plate 25.

I claim:

A device for intimately contacting and treating a contoured surface comprising a supporting member having a transverse slot, a plurality of flat contour-forming elements arranged in laminar array and having facing parallel shank portions extending into said slot and elongated parallel foot portions extending beyond said member and transversely to said shank portions, said elements being movable with respect to each other in a direction lengthwise of said shank portions, the outward edges of said foot portions providing in transverse direction a margin having complemental shape conformable to the contoured surface, and members for clamping said elements in adjusted complemental shape positions, said supporting member being a heat conducting plate, said plate having a mounting block secured thereto, a heating element enclosed in said block in heat transfer relation to said plate, said elements being of good thermally conductive material, said elements being in heat transfer relation of said plate and said outward edges of said foot portions being engageable with the contoured surface over substantial lengths, and, in combination therewith, an adjustable scraper attached in tandem therewith, said scraper comprising an arrayed plurality of scraping elements respectively longitudinally adjustable for conforming to the same contour complemental shape as said flat elements.

References Cited by the Examiner

UNITED STATES PATENTS

| | | | |
|---|---|---|---|
| 854,725 | 5/07 | Devers | 30—172 |
| 1,017,774 | 2/12 | Leavitt | 30—172 |
| 2,062,998 | 12/36 | Peterson. | |
| 2,173,700 | 9/39 | Skarsten | 30—172 |
| 2,315,121 | 3/43 | King. | |
| 2,655,721 | 10/53 | Einhorn | 30—172 |
| 2,765,531 | 10/56 | Campbell et al. | |
| 3,036,190 | 5/62 | Johnson. | |

FOREIGN PATENTS 409,745    5/34    Great Britain.

WILLIAM FELDMAN, *Primary Examiner.*

ANTHONY BARTIS, *Examiner.*